Aug. 23, 1949.     M. BESSONNEAU     2,479,599
FOLDABLE HOOD FOR VEHICLES
Original Filed Oct. 26, 1935     2 Sheets-Sheet 2
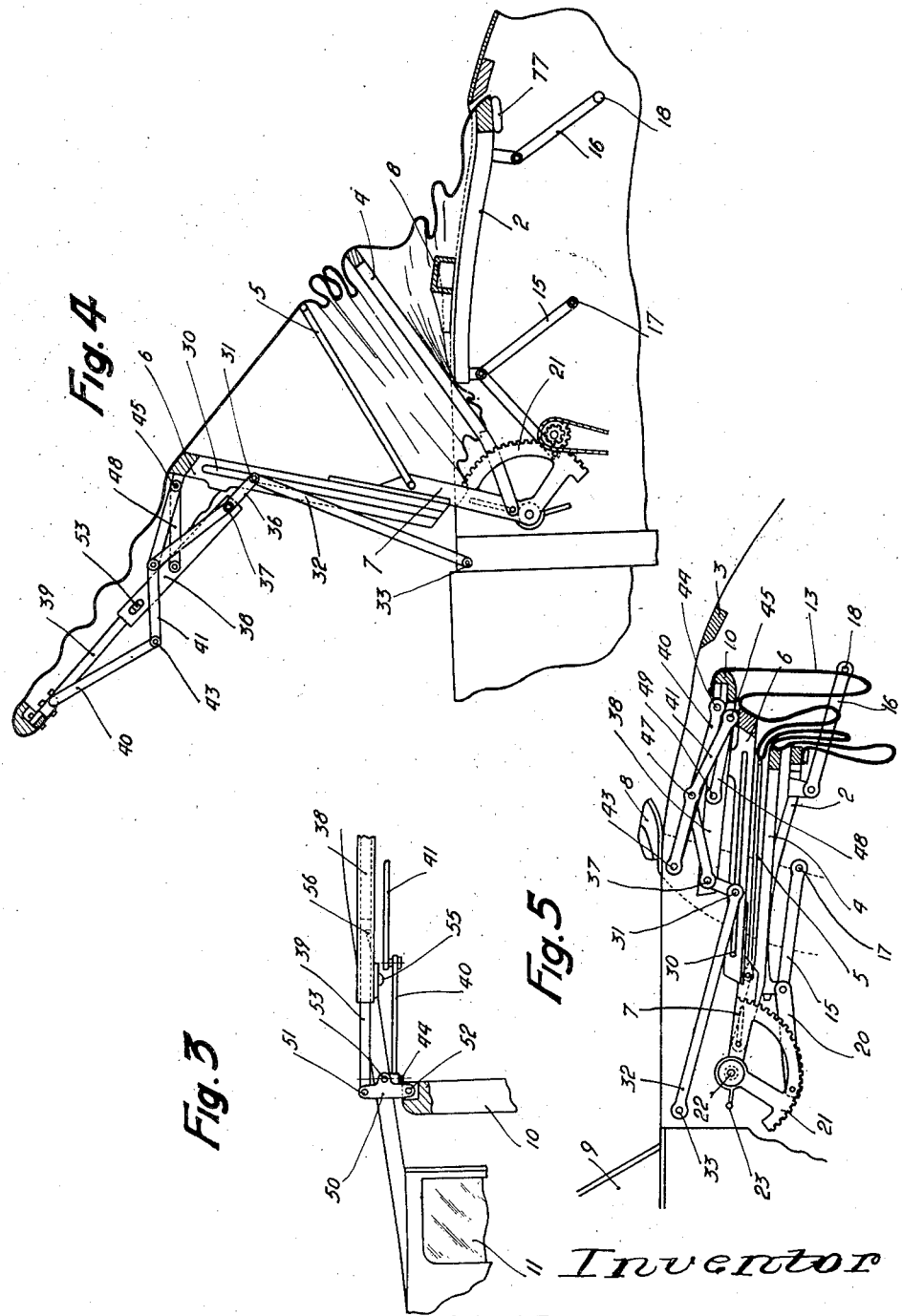
Inventor
M. Bessonneau
By Glascock Downing Seibold
Attys.

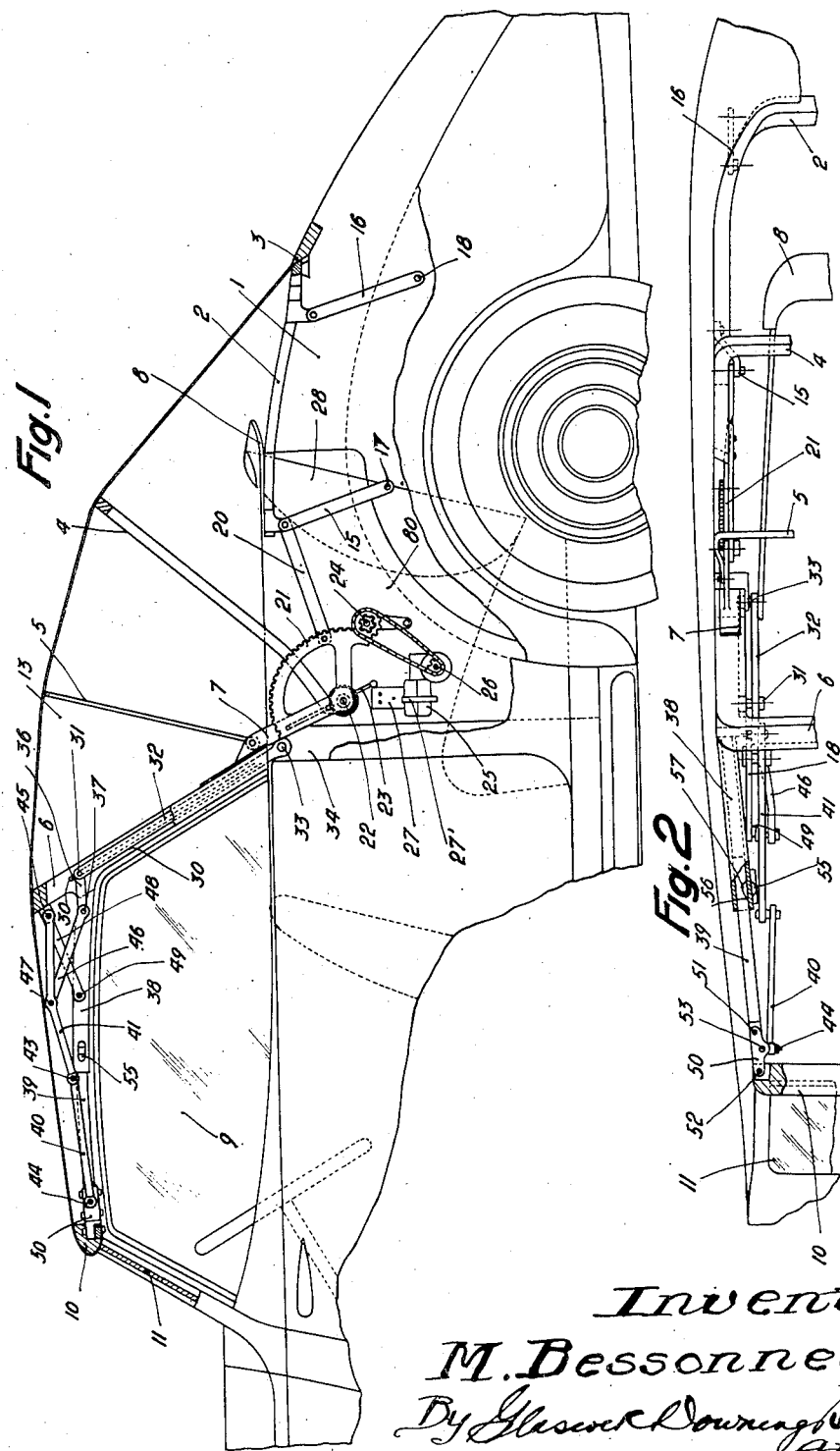

Patented Aug. 23, 1949

2,479,599

UNITED STATES PATENT OFFICE 2,479,599

FOLDABLE HOOD FOR VEHICLES

Maurice Bessonneau, Puteaux, France

Original application October 26, 1935, Serial No. 46,845, now Patent No. 2,185,581, dated January 2, 1940. Divided and this application November 16, 1939, Serial No. 304,822. In France October 27, 1934

Section 3, Public Law 690, August 8, 1946
Patent expires October 27, 1954

5 Claims. (Cl. 296—116)

The present invention relates to a disappearing hood for motor vehicles adapted to travel on land or water or in air, and it has for its object a hood combined with a carriage body and adapted to entirely disappear within the said body, thus transforming an inside driving vehicle into a torpedo.

Another object of my invention consists in such a hood which is adapted for use with all the known types of carriage body which become narrow towards the front of the vehicle.

Further objects, features and advantages of my invention will be set forth in the following description with reference to the annexed drawings which are given solely by way of example and in which:

Fig. 1 is an elevational view, with parts broken away, of a carriage body of a motor vehicle provided with a hood in conformity with the invention.

Fig. 2 is a corresponding plan view with the waterproof canvas removed.

Fig. 3 is a partial view analogous to Fig. 2 showing the hood in an intermediate position.

Figs. 4 and 5 are partial views similar to Fig. 1 and respectively show the top in partly closed and fully closed positions.

In the form of construction shown, a recess 1 whose outlet orifice on the top part of the carriage body has a U shape is formed at the rear of the body of a motor vehicle, and the two branches of this U extending along the two lateral edges of the said body.

The framework of the hood comprises a first tilt hoop 2 which, in the operative position (Fig. 1), bears upon the rear edge 3 of the recess 1 with which it makes a joint, and also three other divergent hoops 4, 5 and 6, whereof the first two, 4 and 5, are pivoted to the lower end 7 of the last hoop 6.

This last hoop 6, whose front part forms the upright support for the lateral glass pane 9, carries the front framework which ends in a cross piece or tip 10 resting upon the top of the windshield 11. The covering consisting of a waterproof canvas 13 has its extreme ends secured respectively to the tilt hoop 2 and to the tip 10 and it may also be secured at an intermediate point to the hoop 6.

The following description relates to the mechanism which is situated on one side of the vehicle, it being understood that the mechanism situated on the other side is symmetrical.

The hoop 2 is mounted so that it will remain practically horizontal as it forms one side of a parallelogram whose other two sides consist of the links 15 and 16 which are pivotally mounted on horizontal pins 17 and 18, located practically in the same horizontal plane. The said hoop is connected by a link 20 to a sector 21 rotatable about a pivot 22, and it participates in the rotation of said sector.

The sector 21 is subjected to the action of a spiral spring 23 which tends to turn it in the direction of the opening of the vehicle body top, and its outer perimeter is in gear engagement with a pinion 24 which is rotated by an electric motor 25 through the medium of reduction gear combined with a friction coupling 26 which limits the torque.

The whole of this mechanism is mounted on a metal plate 28 and may be assembled before the carriage body is constructed, and may be delivered separately, the motor 25 being secured to a member 27 supporting said plate by a collar 27'.

A guide 30 located practically according to a straight line passing through the axis of the pivot 22 is provided in the hoop 6 and is engaged by a travelling member 31 to which is pivoted a link 32, this latter being pivoted to a pivot 33 which is spaced from the shaft 22, and is mounted for instance on the upright 34 of the carriage body.

A small link 36, carried by the travelling member 31, is pivoted on a pin 37 mounted on a guiding bar 38 along which a bar 39 is slidable. The slidable movement of the bar 39 is controlled by two links 40 and 41 which are pivoted together at 43 so as to form a toggle joint; one link, 40, is pivoted about a horizontal pin on a member 44 mounted on the end of the bar 39; the other link, 41, is pivoted on a pivot 45 mounted on the hoop 6. A lever 46 is pivoted at an intermediate point 47 of the link 41 and upon the pivot 37; a rod 48 is pivoted at 45 and also at a point 49 of the guiding bar 38.

As shown in Fig. 2, and in order to adapt the hood to a carriage body which becomes narrow towards the front, the tip 10 is mounted on the bar 39 by means of a swinging piece 50 pivoted both to said bar and to said tip about vertical pins 51 and 52. The member 44 is pivoted on said swinging piece 50 about a vertical pivot 53.

The sliding movement of the bar 39 is limited by a stop formed by a spring stud 55, carried at the forward end of the guiding arm 38 and cooperating with a slot 56 formed on the rear end of the bar 39. The bottom of said slot is inclined towards a rear abutment 57 in such a manner that said stud 55 will gradually move back during the movement in the rear direction of the bar 39 which encounters no obstacle, the outward movement of said bar being limited by the abutment 57.

It will be noted that it will suffice to turn the sector 21 from left to right in order to fold up the whole arrangement in the recess 1. The canvas is unfolded by the rotation of the sector 21 in the opposite direction, the tension of the canvas being maintained by means of the spring 23, as described in my co-pending application Serial No. 46,845, now Patent No. 2,185,581, granted Jan. 2, 1940, of which the instant application is a division.

The inward and outward movements of the bar 39 are controlled by the joint 40—41 operated by the sliding of the travelling members 31 along the guide 30. Said sliding movement is controlled by the link 32 during the rotation of the hoop 6.

When opening out the hood device, the link 40 will continue to move forward after stopping of bar 39 by the contact of the stud 55 and of the abutment 57 and the member 50 will be pivoted outwardly from the position shown in Fig. 3 to the position shown in Fig. 2 so that the tip 10 will be brought forward into its definite position. At the beginning of the folding motion, the parts are brought from the position shown in Fig. 2 to the position shown in Fig. 3. In this manner, the unfolded hood will correspond exactly to the trapezoidal form of the vehicle and the tip will offer no resistance to the inward and outward movements of the telescoping bar 39 and to the disappearing of the hood at the rear of the carriage within the recess 1.

In order to obtain synchronism for the movements on the respective sides of the hood, the motors 25 (one being mounted on each side) are preferably motors of the series type; these are connected in series and are controlled by a reversing switch mounted on the front board.

While I have described what I at present consider preferred embodiments of my invention, it will be obvious to those skilled in the art that various changes and modifications may be made without departing from my invention and I, therefore, aim in the appended claims to cover all such changes and modifications as fall within the true spirit and scope of my invention.

What I claim is:

1. In the combination of a foldable hood with a vehicle body which becomes narrow towards the front and includes two sets of jointed members pivoted on each side of the body respectively, a transversal tip connecting the end parts of said sets, each of said sets including a support pivoted to said body, a guiding bar carried by said support, a further bar in sliding engagement with said guiding bar, means carried by said two bars for limiting the extension motion of the whole formed by the same, a swinging member for carrying said tip pivoted both to said latter and to the end of said further bar and adapted to be displaced between a position corresponding to the folded hood in which it is substantially transversal with reference to the vehicle body and a second position in which it is substantially alined with said sliding member, a transversal pivot carried by said swinging member, and a transversal pivot carried by said support, a controlling articulated system between said two pivots adapted to control both the sliding portion of said bar and the swinging of said swinging member.

2. In a foldable hood for the body of a vehicle becoming narrow towards the front and which includes a transversal end tip and, on either side of said body, a support pivoted to said body and carrying a guiding bar, a further bar in sliding engagement with said guiding bar and an articulated controlling system pivoted to said support adapted to control the extension motion of the sliding bar, a swinging member for carrying said tip and pivoted both to the end of said sliding bar and to said tip about parallel axes which are perpendicular to the transversal direction of said body, a transversal pivot carried by said swinging member, stopping means carried by said bars for limiting said extension motion, and means mounting said articulated system for pivotal movement about said last named transversal pivot, whereby said articulated system is adapted to push said swinging members towards its outward position at the end of the unfolding motion of the hood and conversely.

3. A foldable hood as claimed in claim 2 in which said transversal pivot is supported by said swinging member so that it can pivot about an axis substantially parallel with said axes about which said swinging member is pivoted.

4. In a foldable hood for the body of a vehicle and including a transversal tip and, on either side of the body, a support pivoted to said body, a travelling member in sliding engagement with said support, a longitudinal guiding bar carried by said travelling member, a further bar in sliding engagement with said guiding bar, and a toggle joint pivoted to said support, a swinging member for carrying said tip and pivoted both to the end of said sliding bar and to said tip about parallel axes which are perpendicular to the transversal direction of said body, a transversal pivot supported by said swinging member, stopping means carried by said bars for limiting their extension motion, and means mounting said toggle joint for pivotal movement about said transversal axis whereby said latter is both arranged to control the motions of said sliding bar and swinging member.

5. In the combination of a foldable hood with a vehicle body which becomes narrow towards the front, two sets of jointed members pivoted on each side of said body respectively, connecting means joining said sets, said set including a support pivoted to said body, a travelling member in sliding engagement with said support, a lever pivoted to said body at a point spaced from the pivot point of said support and to said travelling member, a guiding arm, a projecting member rotatably connected to said travelling member and pivoted to said guiding arm, a further arm in sliding engagement with said guiding arm, a stop adapted to limit the extension motion of the whole formed by said arms, a tip, a connecting member pivoted to said tip and to said further arm, a toggle joint between said support and said connecting member and means for rotating said support in both directions.

MAURICE BESSONNEAU.

REFERENCES CITED

The following references are of record in the file of this patent:

UNITED STATES PATENTS

| Number | Name | Date |
| --- | --- | --- |
| 2,157,783 | Bessonneau | May 9, 1938 |